United States Patent [19]

Wang et al.

[11] 4,310,450

[45] Jan. 12, 1982

[54] CROSSLINKABLE AUTODEPOSITION COATING COMPOSITIONS CONTAINING A GLYCOLURIL DERIVATIVE

[75] Inventors: Alan E. Wang, South Charleston; David R. Bassett, Charleston, both of W. Va.

[73] Assignee: Union Carbide Corporation, New York, N.Y.

[21] Appl. No.: 191,999

[22] Filed: Sep. 29, 1980

[51] Int. Cl.$^3$ ............................................... C08K 5/16
[52] U.S. Cl. ...................... 260/29.6 N; 260/29.6 MN; 427/435
[58] Field of Search .................. 427/435; 260/29.6 N, 260/29.6 MN

[56] References Cited

U.S. PATENT DOCUMENTS

| | | | |
|---|---|---|---|
| 3,776,848 | 12/1973 | Hall et al. | 252/49.5 |
| 3,936,546 | 2/1976 | Hall | 427/375 |
| 4,025,962 | 5/1977 | Yamagishi et al. | 428/418 |

FOREIGN PATENT DOCUMENTS

2010875 A 7/1979 United Kingdom.

OTHER PUBLICATIONS

G. G. Parekh, Journal of Coatings Technology, vol. 51, No. 658, pp. 101–110, Nov. 1979.

Primary Examiner—Paul R. Michl
Attorney, Agent, or Firm—Francis M. Fazio

[57] ABSTRACT

Autodeposition coating compositions containing certain relatively water-insoluble derivatives of glycoluril will crosslink upon curing. The resulting coating exhibits improved block resistance and solvent resistance over heretofore available autodeposition coatings.

12 Claims, No Drawings

CROSSLINKABLE AUTODEPOSITION COATING COMPOSITIONS CONTAINING A GLYCOLURIL DERIVATIVE

BACKGROUND OF THE INVENTION

Autodeposition, also known as Autophoresis® or chemiphoresis, is a process for depositing an organic coating on a metal surface. The process involves the controlled release of multivalent metal ions from the metal surface which destabilizes dispersed polymer particles in the coating composition such that a coating builds up on the metal surface. Such systems are well know in the coating art and are described in for example, U.S. Pat. Nos. 3,776,848; 3,791,431; 4,108,817; 3,839,097; 3,829,371; 4,104,424 and 4,030,945.

Autodeposition, though a relatively new procedure for coating metal surfaces, has achieved considerable importance and wide use in the coating industry due to its many advantages over conventional systems, such as electrolytic deposition. By using autodeposition, practitioners of the art can now deposit an inorganic and an organic film simultaneously with fewer operating steps in less time while utilizing less floor space than conventional pretreatment/electrocoating systems. Autodeposition also reduces the air and water pollution associated with conventional coating systems because organic solvent usage is minimized. The use of autodeposition also significantly reduces the energy usage required by certain conventional electrocoating systems. A further advantage is the sharply decreased safety risk attained by avoiding the use of electric current in the coating bath.

A major disadvantage of autodeposition coatings is the very great difficulty in obtaining an autodeposition coating which will crosslink upon curing. It is believed that this difficulty is due to the low pH which is required for autodeposition. Conventional crosslinkers, when introduced to the highly acidic autodeposition coating compositions tend to cause destabilization of the autodeposition composition. Since crosslinking generally has a beneficial effect on the characteristics of the cured coating, an autodeposition coating composition which can remain stable as a coating bath and which will crosslink upon curing would be of great advantage.

SUMMARY OF THE INVENTION

It has now been found that certain water insoluble derivatives of glycoluril will effectively crosslink autodeposition coatings when employed in autodeposition coating compositions without causing destabilization of the coating mixture.

DESCRIPTION OF THE INVENTION

Throughout this application the term glycoluril is used in lieu of the more formal chemical term tetramethylolimidazo(4,5-d)imidazole-2,5-(1H,3H)-dione.

This invention comprises autodeposition coating compositions which contain certain water insoluble derivatives of glycoluril. By water insoluble it is meant a compound, which shows little or no solubization when mixed with water.

The water insoluble derivatives of glycoluril which are useful in the crosslinkable autodeposition compositions of this invention have the formula

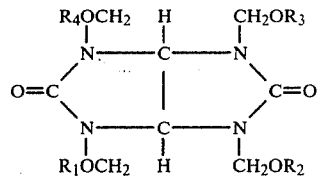

wherein $R_1$, $R_2$, $R_3$ and $R_4$ are each singly alkyl groups having at least 2 carbon atoms. There is no strict upper limit to the number of carbon atoms in the alkyl groups. The compound begins to lose its water insolubility and therefore its utility if the alkyl segments have less than 2 carbon atoms. The alkyl segments may be linear or branched and may contain any substituents which do not unduly interfere with the crosslinking.

Illustrative of the water insoluble derivatives of glycoluril useful in the crosslinkable autodeposition compositions of this invention one can name tetrabutoxymethyl glycoluril, diethoxydibutoxmethyl glycoluril, tetrapentoxymethyl glycoluril, and the like. A preferred compound is tetrabutoxymethyl glycoluril.

The water insoluble derivatives of glycoluril are employed in the improved autodeposition coating compositions of this invention in a concentration of from 0.1 to 30 weight percent, preferably from 1 to 15 weight percent based on the dry weight of the resin employed in the coating.

The improved autodeposition coating compositions of this invention contain an acid compound in a sufficient concentration such that the pH of the composition is less than 5, preferably from 2 to 3. Illustrative of the many acids suitable for use in the compositions of this invention one can name hydrofluoric acid, hydrochloric acid, formic acid, acetic acid, sulphuric acid, nitric acid, phosphoric acid, hydrobromic acid, hydroidic acid, chloroacetic acid, trichloroacetic acid, lactic acid, tartaric acid, polyacrylic acid, and the like. The preferred acid is hydrofluoric acid.

The improved autodeposition coating compositions of this invention also contain from 1 to 30 weight percent, preferably from 5 to 20 weight percent, based on the total weight of the composition, of resinous coating materials. The resinous coating material is provided to the autodeposition composition in the form of an aqueous dispersion or latex. The latex is composed of from 10 to 60 weight percent of resinous coating material, preferably from 30 to 50 weight percent, based on the total weight of the latex.

Virtually, any resin materials which are capable of producing autodeposition coatings can be used and illustrative of these materials one can name homo-and copolymers of ethylene, butadiene, ethyl acrylate, butyl acrylate, 2-ethylhexyl acrylate, butyl methacrylate, vinyl chloride, vinylidene chloride, methyl methacrylate, acrylonitrile, acrylic acid, methacrylic acid, styrene and the like.

A preferred polymer for use in the improved autodeposition compositions of this invention has a compositions of:

(1) from 60 to 90 weight percent, preferably from 75 to 99 weight percent of polymerizable ethylenically monounsaturated or diunsaturated monomers such as styrene, acrylonitrile, methacrylonitrile, vinyl chloride, vinylidine chloride, butadiene, ethylene, the esters of acrylic acid and methacrylic acid having from 1 to 20 carbon atoms, and the like;

(2) from 1 to 20 weight percent, preferably from 4 to 16 weight percent, of polymerizable ethylenically unsaturated carboxylic acid such as methacrylic acid, acrylic acid, itaconic acid, maleic acid, and the like;

(3) from 0 to 20 weight percent, preferably from 0 to 6 weight percent, of a hydroxyl group containing polymerizable ethylenically monounsaturated monomer such as 2-hydroxyethyl acrylate, 2-hydroxypropyl methacrylate, and the like; and (4) from 0 to 1.5 weight percent, preferably from 0 to 1.25 weight percent, of a polymerizable ethylenically polyunsaturated monomer, such as trimethylolpropane triacrylate, ethylene glycol dimethacrylate, and the like; wherein the concentration of components (1)–(4) are based on the total combined weight of components (1)–(4).

The autodeposition coating composition also contains oxidizing agents in an amount sufficient to provide an oxidizing equivalent of at least 0.01 per liter of coating composition, preferably from 0.1 to 0.2. The upper equivalent value is not critical, and can be as high as one equivalent, or higher, per liter of the coating bath. The oxidizing agents are well known to those skilled in the art and many are described in, for example, U.S. Pat. No. 4,030,945. Illustrative of the many suitable oxidizing agents one can name hydrogen peroxide, sodium or potassium permanganate, perborate, bromate, nitrite, nitrate, chlorate, and the like. A preferred oxidizing agent is hydrogen peroxide.

It is preferred that the latex used in the improved autodeposition compositions of this invention have a particle size of less than 0.3 micron; it is particularly preferred that the particle size be less than 0.15 micron.

A preferred autodeposition composition contains fluoride ion in a concentration of from 0.1 to 20 grams per liter, preferably from 2 to 8 grams per liter. A particularly preferred autodeposition composition contains ferric fluoride in a concentration of from about 1 to about 5 grams per liter.

The improved autodeposition coating composition of this invention can also contain other additives commonly employed in autodeposition coatings. These additives are well known to those skilled in the art as are the concentrations in which they are normally present if employed; these additives include pigments, film aids, surfactants and other dispersing aids, protective colloids, leveling agents, foam control agents, auxiliary stabilizers and the like and are discussed in the patents heretofore mentioned.

The balance of the autodeposition coating compositions of this invention, in sufficient amount such that the previously described concentrations of components are attained, is composed of water.

The compositions of this invention are useful in coating metal substrates which can be coated by autodeposition. These metals include iron, steel, alloys of iron, galvanized steel, zinc, aluminum, alloys of aluminum, and the like.

The crosslinkable autodeposition compositions of this invention are applied to the metal substrates using conventional autodeposition procedures and cured by use of the conventional techniques used to cure autodeposition coatings. Those skilled in the art are fully familiar with these conventional autodeposition coating and curing techniques and procedures and no further elucidation is necessary here.

When cured, the crosslinkable autodeposition coating compositions of this invention exhibit significantly improved solvent and block resistance over the heretofore available uncrosslinkable autodeposition coating compositions.

It is entirely unobvious why the autodeposition compositions of this invention containing the water insoluble derivatives of glycoluril retain their stability over extended periods of time and crosslink upon curing; especially in view of the fact that autodeposition compositions containing water soluble derivatives of glycoluril do not crosslink to any great extent upon curing. Applicants have solved a problem of longstanding concern in the autodeposition art; by use of the teachings herein, practitioners of the autodeposition art are now provided with a stable autodeposition coating which will crosslink upon curing. Many conventional crosslinkers have been added to autodeposition coatings in attempts to produce such stable crosslinkable autodeposition coatings but these attempts have heretofore not succeeded. That the specific compounds found useful by applicants would effectively crosslink autodeposition coatings without causing destabilization of the latex in the application bath could not have been predicted from the prior art and was completely unexpected.

The following examples serve to further illustrate the invention. They are not intended to limit the invention in any way.

EXAMPLE 1

An autodeposition coating composition was prepared as follows:

To 8 grams of distilled water there were added 8 grams of tetrabutoxymethyl glycoluril having 97 percent total solids and 0.08 gram of sodium dodecylbenzene sulfonate. The mixture was stirred vigorously and there was added 200 grams of a latex with a pH in the range of 4 to 7 containing 42 percent solids of a copolymer of 35/55/10-styrene/butyl acrylate/methacrylic acid. Thus the tetrabutoxymethyl glycoluril was in a concentration of about 10 weight percent based on the dry weight of the resin. The mixture was then allowed to equilibrate at room temperature for from 1 to 2 days. After this period, the latex mixture was diluted with 400 ml of distilled water.

Fifty ml of an autodeposition starter solution composed of water, 15 ml of a 21 percent solution of hydrofluoric acid and 4.1 grams of ferric fluoride, were diluted with 100 ml of water and slowly added to the latex mixture. Distilled water was then added to make the final volume of the coating bath 1 liter. The coating had a pH of about 2.2.

For comparative purposes, three other autodeposition coatings were formulated using a procedure similar to that above but not employing the tetrabutoxymethyl glycoluril. One coating employed 8 grams of dimethyoxy-diethoxymethyl glycoluril having a total solid content of 95 percent. This compound is soluble in water as well as in most organic solvents. A second comparative coating was formulated with 16 grams of a 45 percent aqueous solution of tetramethylol glycoluril which is soluble in water but insoluble in most organic solvents. The third comparative coating was formulated without the addition of a compound to substitute for the tetrabutoxymethyl glycoluril; thus this third comparative coating contained no glycoluril derivative. All of the coatings were still stable after storage for two weeks at room temperature.

Four cold rolled steel panels measuring 7.5 × 10 centimeters were cleaned with a dilute solution of an alkaline detergent containing phosphate and nonionic surfactants at 150° F. for 2 minutes followed by rinsing with a deionized water spray. Each panel was then dipped in one of the four coating baths prepared above for 1 minute at ambient temperature, removed from the bath and held in the air for 1 minute, rinsed with tap water for 1 minute and then baked for 15 minutes at 160° C.

Part of the cured coating was removed from each panel and the gel fraction of each coating was analyzed by solvent extraction to determine the extent of crosslinking according to a procedure similar to ASTM (D-297-18)37.

The results are shown in Table I.

TABLE I

| Run | Additive | Gel Fraction (%) |
|---|---|---|
| 1 | Tetrabutoxymethyl glycoluril | 97.6 |
| 2 | Dimethoxydiethoxymethyl glycoluril | 3.7 |
| 3 | Tetramethylol glycoluril | 1.4 |
| 4 | None | 1.4 |

The results clearly demonstrate that the water insoluble derivative of glycoluril used in Run 1, when added to autodeposition coating compositions significantly increases the extent of crosslinking in such coatings over that obtained when no additive is employed or when the additive is water soluble.

EXAMPLE 2

Two groups of steel panels were prepared following a procedure similar to that of Example 1 except that after the final tap water rinse, the coated panels were immersed for 1 minute in an autodeposition reaction rinse which had hexavalent chrome in solution before being baked for 15 minutes at 160° C. One group was coated with the coating composition containing tetrabutoxymethyl glycoluril employed in Run 1 of Example 1 and the other group was coated with the coating composition containing no additive employed in Run 4 of Example 1. After baking each group was pressed together face to face at 50 psig for 4 hours to determine the block resistance of each cured coating according to a procedure similar to ASTM (D-2793)27.

After the panels had been removed from the press, the coating containing the tetrabutoxymethyl glycoluril displayed good block resistance; the panels did not stick to one another. The coating containing no additive displayed poor block resistance; the panels adhered to one another.

This example demonstrates that the crosslinkable autodeposition coatings of this invention display significantly improved block resistance over that obtained from the heretofore available uncrosslinkable autodeposition coatings.

EXAMPLE 3

Two steel panels were prepared using a procedure similar to that of Example 2; one panel was coated with the coating composition containing tetrabutoxymethyl glycoluril and the other panel was coated with the coating compositions containing no additive described in Example 1. The panels were evaluated for solvent resistance by ASTM 2792-69. The coated panels were soaked in regular leaded gasoline for 24 hours and then allowed to dry and recover in air for 30 minutes. The pencil hardness (ASTM(D3363)27) of the coatings was determined before and after the soak. Both coatings had a pencil hardness of 2H before soaking. After the gasoline soak the crosslinked coating containing tetrabutoxymethyl glycoluril had a pencil hardness of B while the uncrosslinked coating had a pencil hardness of less than 4B.

This example clearly demonstrates that the crosslinkable autodeposition coatings of this invention display significantly improved solvent resistance over that obtained from the heretofore available uncrosslinkable autodeposition coatings.

COMPARATIVE EXPERIMENT A

Following a procedure similar to that of Example 1, an autodeposition coating composition was formulated employing a conventional crosslinking agent in place of the tetrabutoxymethyl glycoluril used in Example 1. In this comparative experiment the crosslinker added to the bath was 10.5 grams of hexamethoxymethyl melamine. The latex employed was a 42 percent solids composition of a copolymer of 45/45/5/5-styrene/ethyl acrylate/methacrylic acid/2-hydroxyethyl acrylate. All other conditions and amounts were the same as those employed in Example 1. The pH of the coating was about 2.2. About 2 hours after the preparation of the coating bath the coating composition had destabilized and the bath was a solid mass. This experiment, when compared with the results of the examples wherein the coating compositions remained stable for at least 2 weeks, vividly demonstrates the great difficulty in attempting to employ the heretofore known crosslinkers in autodeposition coatings which are characterized by a low pH. It is this longstanding problem in the autodeposition art which applicants' invention has solved.

What is claimed is:

1. In an aqueous autodeposition coating composition having a pH less than 5 comprising:
   (I) water;
   (II) a source of hydrogen ion;
   (III) an oxidizing agent; and
   (IV) a latex;
the improvement consisting of having from 0.1 to 30 weight percent, based on the dry weight of the resinous coating material in said latex, of a water insoluble derivative of glycoluril of the formula:

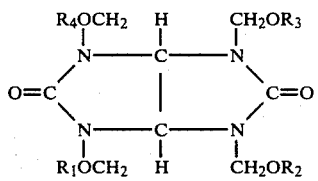

wherein $R_1$, $R_2$, $R_3$ and $R_4$ are each singly alkyl having at least 2 carbon atoms.

2. An improved composition as claimed in claim 1 wherein said water insoluble derivative of glycoluril is present in a concentration of from 1 to 15 weight percent.

3. An improved composition as claimed in claim 1 wherein said water insoluble derivative of glycoluril is tetrabutoxymethyl glycoluril.

4. An improved composition as claimed in claim 1 wherein said pH is from 2 to 3.

5. An improved composition as claimed in claim 1 wherein there is additionally present fluoride ion in a concentration of from 0.1 to 20 grams per liter.

6. An improved composition as claimed in claim 1 wherein said source of hydrogen ion is hydrofluoric acid.

7. An improved composition as claimed in claim 1 wherein there is present ferric fluoride in a concentration of from about 1 to about 5 grams per liter.

8. An improved composition as claimed in claim 1 wherein said oxidizing agent is present in an amount sufficient to provide an oxidizing equivalent of at least 0.01 per liter of composition.

9. An improved composition as claimed in claim 1 wherein the resinous coating material of said latex comprises from 1 to 30 weight percent of said aqueous autodeposition coating composition.

10. An improved composition as claimed in claim 1 wherein the resinous coating material of said latex comprises from 5 to 20 weight percent of said aqueous autodeposition coating composition.

11. An improved composition as claimed in claim 1 wherein the resinous coating material is a polymer having a composition of
(1) from 60 to 99 weight percent of polymerizable ethylenically monounsaturated or diunsaturated monomers;
(2) from 1 to 20 weight percent of polymerizable ethylenically unsaturated carboxylic acid;
(3) from 0 to 20 weight percent of hydroxyl group containing polymerizable ethylenically monounsaturated monomer; and
(4) from 0 to 1.5 weight percent of a polymerizable ethylenically polyunsaturated monomer; wherein the concentrations of components (1)–(4) are based on the total combined weight of components (1)–(4).

12. An improved composition as claimed in claim 1 wherein said latex has a particle size of less than 0.5 micron.

* * * * *